United States Patent Office 2,911,388
Patented Nov. 3, 1959

2,911,388
PROCESS FOR THE PREPARATION OF HARDENABLE CONDENSATION PRODUCTS

Hans Weisbart and Wolfgang Förster, Hamburg, Germany, assignors to Reichhold Chemicals, Inc., Detroit, Mich.

No Drawing. Application June 3, 1955
Serial No. 513,158

Claims priority, application Germany June 16, 1954

4 Claims. (Cl. 260—58)

The invention relates to improvements in the preparation of hardenable epoxy type condensation products and to the resulting product, and the present application is a continuation-in-part of our application Serial No. 513,157, filed June 3, 1955, which application relates to a process for the preparation of hardenable condensation products, in a manner whereby to a novolac practically free from phenol that was produced by acid condensation of phenol or one of its polymers, and an aldehyde such as formaldehyde or paraformaldehyde, there is added free phenol or its homologues and this mixture is etherified in alkaline solution with an epihalogen hydrin. The molar ratio of the two components of the novolac is variable within wide limits. Instead of the phenol or its homologues substituted monophenols such as halogenated phenols may be added to the novolac.

It has now been found that resinous compounds can be produced in advantageous manner from a crude novolac and epihalogen hydrin or $\alpha,\alpha'$-dihalogen hydrin, compounds that are eminently well suited as casting resins. In contradistinction to the purified novolacs, involved in the crude novolacs are the unhomogeneous reaction mixtures that are obtained in the acid condensation of phenols with aldehydes, preferably formaldehyde. These mixtures consist of a lower novolac layer, which contains in solution in addition to water the excess phenol used in the particular instance, whereas the upper layer consists practically entirely of water.

Hardenable products to be well manipulated may be recovered by allowing the etherification of a crude novolac to take place with epichlorohydrin in alkaline solution in the presence of existing excess phenol. The production of the crude novolac turns out to be particularly simple for the reason that any stripping is dispensed with. The phenol is condensed in acid solution with formaldehyde and the reaction mixture consisting of novolac and free phenol is converted without separation of the existing water by direct reaction with epichlorhydrin in alkaline solution. The optimum of quotients $$Q=\frac{\text{Mols formaldehyde}}{\text{Mols phenol}}$$

employed lies at 0.5 in the use of phenol. For phenol homologues, the functionality of which as compared to the formaldehyde is less (about para- or ortho-cresol), the Q value is somewhat higher. With lowering Q value the chemical, mechanical and electric properties become impaired, whereas Q values that are too high give epoxide resins that are of difficult solubility or are insoluble and infusible.

The products prepared according to the invention may be mixed in known manner with filling materials and pigments and they can be dyed with suitable dyes. Through addition of certain amines, such for example as triethanolamine, piperidine, etc., or polyvalent acids or their anhydrides, such for example as phthalic acid and maleic acid, the products may be hardened in known manner. The electric properties render them particularly well suited to the production of insulating material. The resins in the hardened condition are characterized by high ability to stand up under mechanical and chemical influences. The light color of the products renders them suitable for the production of decorative material.

Example I 1410 parts of phenol, 645 parts of 35% aqueous formaldehyde solution and 14 parts of oxalic acid are boiled with reflux with stirring for 2-3 hours. The $CH_2O$ content of the aqueous layer is then 0.2–0.3%. There is added 600 parts of caustic soda, dissolved in 6000 parts of water, it is heated to 60° and 1390 parts of epichlorhydrin is allowed to run in swiftly with vigorous stirring. After a short time the reaction begins with evolution of heat. By cooling the possibility of exceeding a temperature of 80° is precluded. After a half hour's stirring the supernatant water is drawn off and the resin remaining behind is washed a number of times with hot acidulated water. By heating under decreased pressure it is dehydrated. It then still contains a smaller amount of common salt, which is removed by filtration of the resin dissolved in acetone. Thereupon the solvent is distilled off, finally under decreased pressure.

Yield: 1840 parts of resin.

Instead of phenol also its homologues can be used, for example cresol.

Example II

Operation as in Example I. Resin of 432 parts of cresol DAB IV (technical cresol mixture), 172 parts of formaldehyde solution (36%), 4 parts of oxalic acid, 370 parts of epichlorhydrin and 160 parts of caustic soda.

In the above examples it will be understood that the parts are by weight, and that the abbreviation "DAB IV" refers to volume IV of a standard German publication translated as The German Pharmaceutical Book. Also, the molecular ratio of formaldehyde to the monophenol is about .5 mol of formaldehyde per mol of the phenol, and the ratio of halogen hydrin to phenolic hydroxyl groups is about 1 mol of the hydrin to 1 mol of phenolic hydroxyl groups.

We claim:

1. A process for the production of hardenable condensation products which comprises reacting at an elevated temperature not above 80° C. (1) a crude novolac produced by acid condensation with refluxing of (a) phenol, (b) aqueous formaldehyde in the molar ratio of about .5 mol formaldehyde per mol of phenol until substantially all said formaldehyde is reacted, said crude novolac containing an excess of free unreacted phenol, all the phenol originally added being retained in the crude novolac, with (2) a glycerol halogen hydrin which is a member of the group consisting of epihalogen hydrins and $\alpha,\alpha'$-dihalogen hydrins in aqueous alkaline solution, the ratio of the halogen hydrin to phenolic hydroxyl groups being approximately 1 mol of the hydrin to 1 mol of phenolic hydroxyl groups.

2. A process as set forth in claim 1 wherein the halogen hydrin is an epihalogen hydrin.

3. A process as set forth in claim 1 wherein the halogen hydrin is a dihalogen hydrin.

4. A hardenable epoxy condensation product produced in accordance with claim 1.

References Cited in the file of this patent
UNITED STATES PATENTS

| | | |
|---|---|---|
| 2,142,007 | Schlack | Dec. 27, 1933 |
| 2,658,885 | D'Alelio | Nov. 10, 1953 |
| 2,695,894 | D'Alelio | Nov. 30, 1954 |
| 2,716,099 | Bradley et al. | Aug. 23, 1955 |